Oct. 26, 1954     F. A. LANDER     2,692,795
DEMOUNTABLE TRUCK TOP FRAME
Filed Jan. 7, 1953     4 Sheets-Sheet 1

INVENTOR
FRED A. LANDER,
BY Mason, Mason & Sheridan
ATTORNEYS

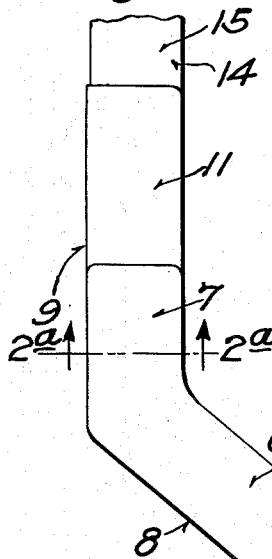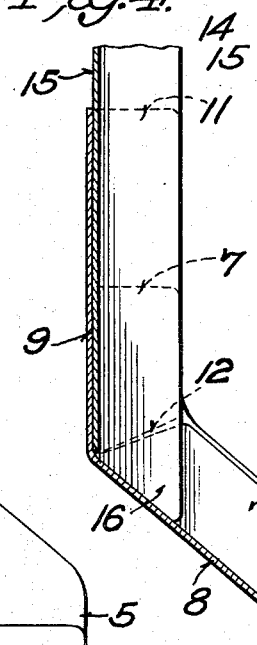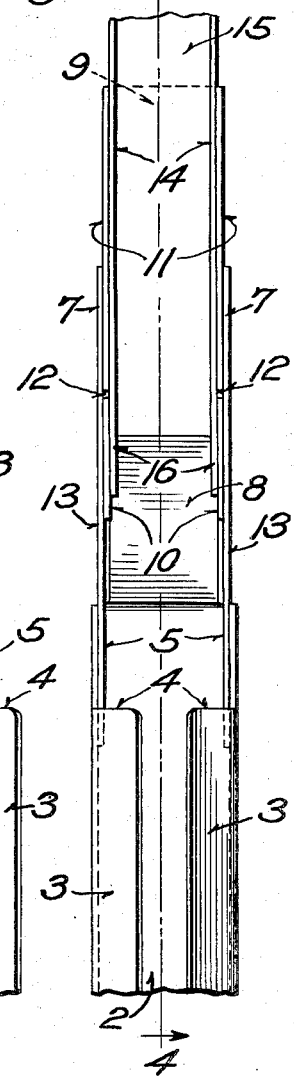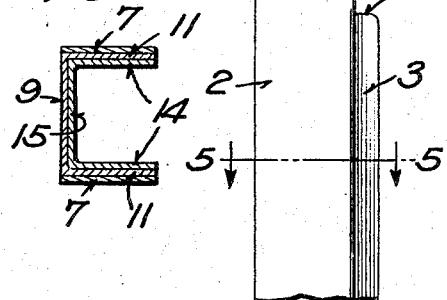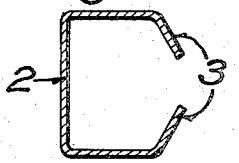

Oct. 26, 1954  F. A. LANDER  2,692,795
DEMOUNTABLE TRUCK TOP FRAME
Filed Jan. 7, 1953  4 Sheets-Sheet 3
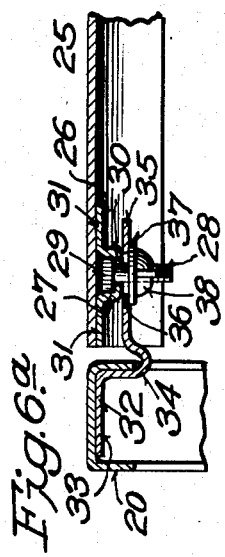
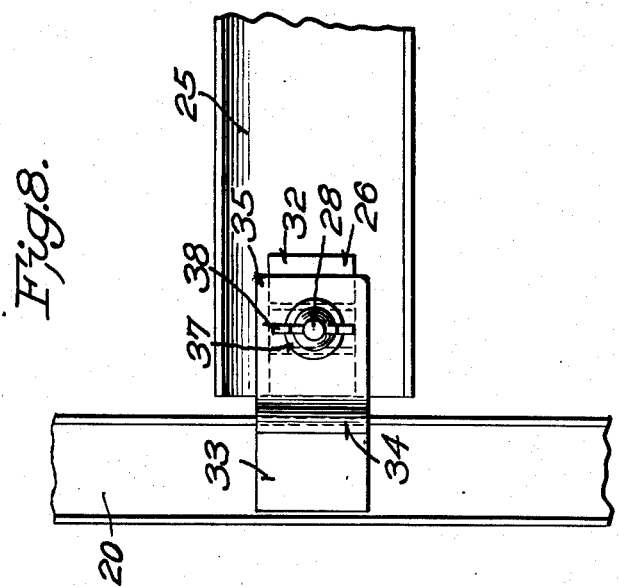
INVENTOR
FRED A. LANDER,
BY
ATTORNEYS.

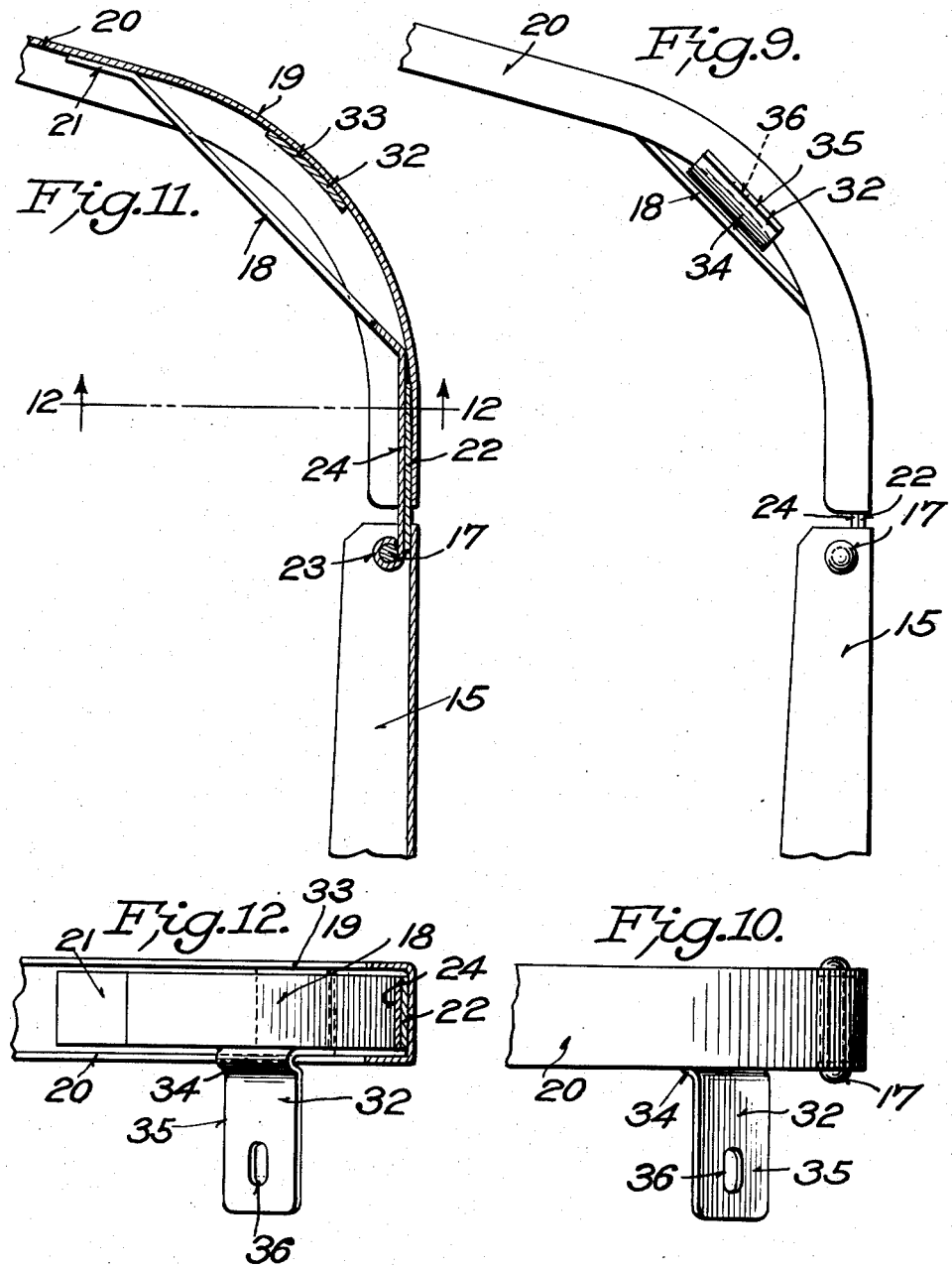

Patented Oct. 26, 1954

2,692,795

UNITED STATES PATENT OFFICE 2,692,795

DEMOUNTABLE TRUCK TOP FRAME

Fred A. Lander, Dallas, Tex., assignor to William F. Long, Dallas, Tex.

Application January 7, 1953, Serial No. 329,949

6 Claims. (Cl. 296—102)

This invention relates to a demountable truck top frame for automotive vehicles such as trucks, particularly pick-up trucks. The purpose of the frame is to support a tarpaulin or other fabric cover or top on the rear or cargo portion of a truck body.

An object of the invention, therefore, is to provide a removable framework that is composed of a minimum of parts which may be easily removed from the truck body and that can be quickly assembled and disassembled, and which requires a minimum of storage space when not in use.

A further object of the invention is to provide a tarpaulin frame for automotive vehicles such as a standard pick-up truck which may be used with said truck without the addition of adapters and which practically eliminates vibration noises and rattles that is composed of a minimum number of light-weight parts.

Other objects of the invention will be disclosed hereinafter throughout the specification, and in the drawings forming a part thereof, in which:

Figure 2 is a front elevation partly broken away of one of the upright standards;

Figure 2a is a section on the line 2a—2a of Figure 2;

Figure 3 is a side elevation of the standard shown in Figure 2;

Figure 4 is a vertical section of the standard of Figures 2 and 3, taken on the line 4—4 of Figure 3;

Figure 5 is a horizontal section, taken on the line 5—5 of Figure 2;

Figure 6 is a cross section on line 6—6 of Figure 7;

Figure 6a is a longitudinal section on line 6a—6a of Figure 7;

Figure 7 is a top plan view of the structure shown in Figure 6, partly in section;

Figure 8 is a bottom plan view of the structure shown in Figure 7;

Figure 9 is a front elevational view partly broken away, of the connection between an end bow and an upright standard;

Figure 10 is a top plan view of the structure shown in Figure 9;

Figure 11 is a vertical section taken medially through the structure shown in Figure 9, and Figure 12 is a horizontal sectional view on the line 12—12 of Figure 11.

Figure 1:
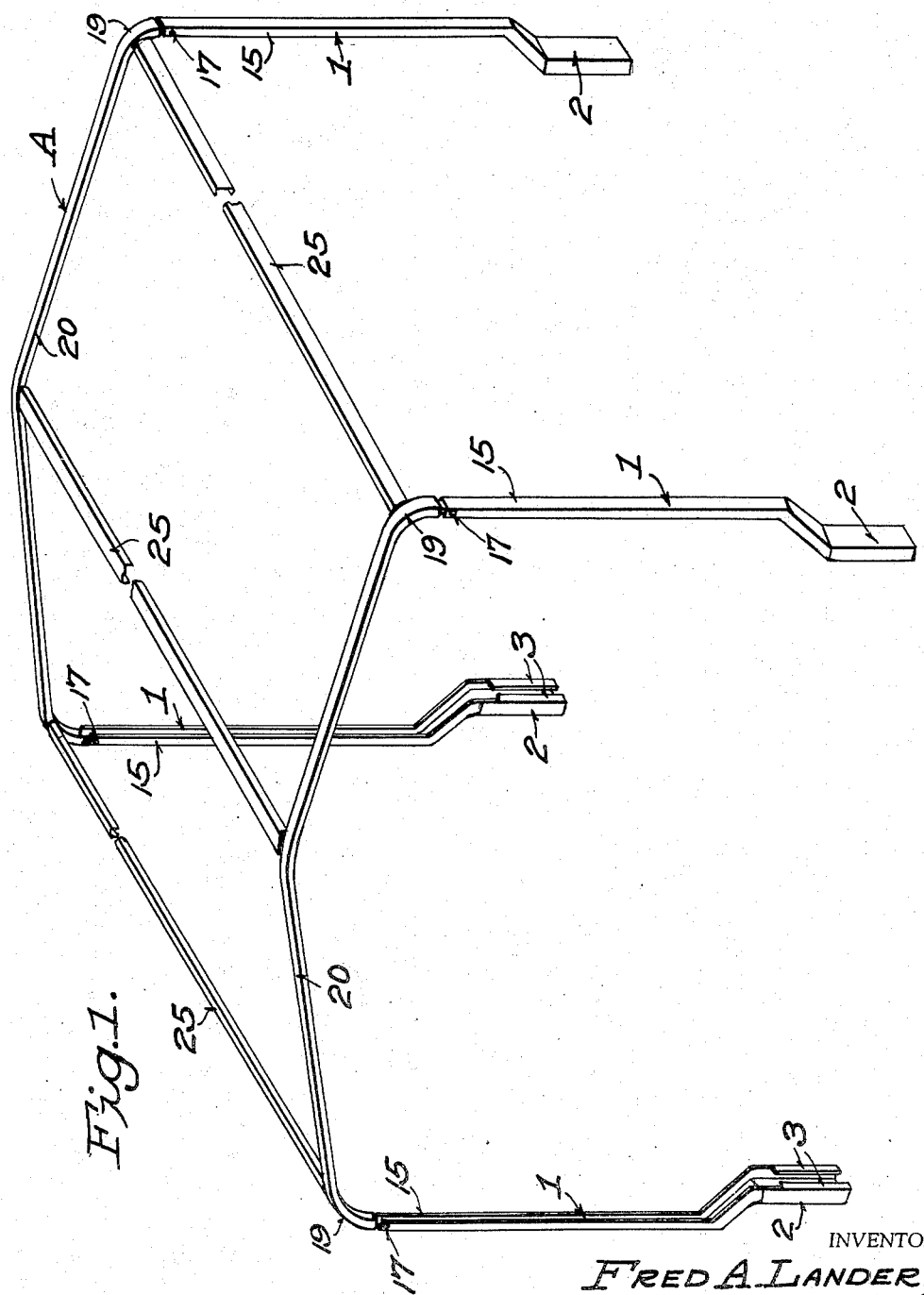
Figure 1 is a perspective view of the frame in set-up position.

The device of this invention includes a demountable top framework including a plurality of upright standards, the lower portions of which are constructed for insertion into the stake recesses of an automotive vehicle such as those of a pick-up truck. Each pair of upright standards is foldably connected by an end bow, and the several end bows are detachably connected to each other by ridge bars.

Referring to the drawings, in which the numbers indicate like parts in the several figures, the letter A indicates the top framework as a whole. Although only four upright standards, two end bows, and three ridge bars have been shown, it will be distinctly understood that additional pairs of standards, end bows, and ridge bars may be used according to requirements such as the length and width of the storage space of the truck body, within the scope of the invention.

Referring particularly to Figures 1 to 5, the lower portion of each upright standard is indicated by the numeral 1. This lower portion includes a plurality of braced offset members comprising a lower sleeve member 2 having three sides and projecting angular flanges 3. Inasmuch as the parts are composed of sheet metal of suitable gauge, each sleeve is adapted to be inserted and resiliently held in the stake support or socket of a truck, which sockets are spaced along the longitudinal sides thereof. The projecting flanges 3 are resilient in that they engage the sides of the stake support and cause a tight fit to be made between the sleeve and the inner sides of the socket or stake support.

The flanges terminate in an upward direction along the line 4 so as to form a holding means for the lower extensions 5 of the offset portions 6 whose upper ends are provided with angular extensions 7. These offset portions, of which there are two for each upright standard, consist of sheet metal members which lie in parallel planes.

The lower sleeve member 2 is provided with an offset portion 8, and an upward extension 9. The said offset portion 9 is provided with sides 10, and there are provided filler plates 11, as shown. Gusset plates 13 are connected to the filler plates and to the sides of the lower sleeve member 2. The lower end of the member 15 is provided with an angular extension 16 as seen in Figures 3 and 4, the lower surfaces of which lie closely adjacent to the offset portion 10.

It will be noted, therefore, that the lower end of each upright standard is composed of five parts, all of which are channel-shaped except the filler plates and gusset plates.

Each of these several parts are rigidly connected to each other, preferably by spot-welding, including the sides of the channels as well as the overlapping web which connects the side portions of the channel-shaped members. The projecting angular flanges 3 are welded to the contacting sides of the several channel-shaped members which they lie against. It will be appreciated that the construction above described not only provides a non-rattling, resiliently held upright standard for each stake support, but also provides, due to its offset construction, an enlarged space within the truck framework for the accommodation of articles to be transported by the truck.

As shown in Figures 1 and 9 to 12, the upper end of each vertical channel-shaped member 15 provides an open end, and this open end is provided with a pivot 17 for securely supporting one of the lower ends of the end bow and permitting these parts to be folded during shipment, i. e., in knocked-down condition. As shown in Figures 9 and 11, a strap 18 bridges the curved portion 19 of the end bow 20. The upper end of the strap is welded at 21 to the underside of the end bow, and the lower end 22 extends along the inside portion of the end bow and is provided with an eye 23 for the reception of the pivot, and is doubled back to provide an upwardly extending portion 24 overlying the strap lower end 22. These two portions of the strap are preferably spot-welded to each other and to the end bow. The strap forms a rigid reinforcement for the curved lower end of each end bow, and further provides at its lower end, the eye of the hinge that connects the end bow to the vertical channel-shaped member 15 in order to allow folding of these parts. Each end bow is, therefore, pivotally and irremovably connected to a pair of upright standards. Of course, these parts may be disconnected from each other by removing the pivot 17, but it is preferred that they remain connected to each other, even when the frame has been disconnected from the truck body and the parts stored. Due to the hinge connection, each pair of upright standards may be folded to lie closely adjacent to its end bow during shipment or storage of the frame.

Each ridge bar 25 is preferably generally channel-shaped in cross section. At the opposite end of each ridge bar is a plate 26 having a channel 27 for the reception of a screw threaded bolt 28, the square head 29 of which fits in the channel and prevents the bolt from turning, although it permits free oscillatory movements of the bolt in the aperture 30 through which it extends for purposes of adjustment. The flanges 31 are preferably spot-welded to the underside of the ridge bar, the construction being identical at each end of the said ridge bar. As shown in Figures 6 to 12, each ridge bar is provided with a plurality of connecting members 32, each provided with a flange 33 which is welded to the underside of the end bow. Said members are each provided with a U-shaped central portion 34 for straddling one of the flanges of the end bow, and a protruding portion 35 having a slot 36 for the reception of the screw threaded bolt 28. Mounted on the bolt are one or more washers 37 and a wing nut 38.

The above description and drawings disclose a single embodiment of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new and what is desired to be secured for Letters Patent is:

1. A demountable truck top framework comprising a plurality of upright standards, a plurality of channel-shaped bows, means pivotally connecting each pair of upright standards to one of said bows, a plurality of channel-shaped ridge bars, means detachably connecting each ridge bar to one of said bows comprising a plate mounted within the channel of the ridge bar on the underside thereof adjacent the end of the ridge bar, a screw threaded bolt mounted non-rotatably in said plate, a connecting member rigidly attached to said bow within the channel thereof, said connecting member having an aperture adapted to be engaged by said bolt, and screw threaded means adapted to retain said apertured member on said bolt.

2. The structure of claim 1, wherein the connecting member is provided with a U-shaped central portion for straddling one of the flanges of said bow.

3. The structure of claim 1, wherein said plate is welded to the underside of the ridge bar, said plate having a channel for the reception of the bolt-head of said screw threaded bolt.

4. In a demountable truck top framework comprising a plurality of upright standards, a plurality of bows, each bow being pivotally connected at its ends to a pair of said standards, at least one ridge bar removably attached to a pair of said bows, each upright standard having a lower portion, said lower portion including a channel-shaped lower sleeve member, spring means on said sleeve member whereby said sleeve member is adapted to resiliently engage within a stake socket of a truck body, said spring means comprising a plurality of angularly projecting flanges extending in angular relationship toward each other across the open side of said channel-shaped sleeve member.

5. The structure of claim 4, wherein the lower portion of each upright standard is provided with an offset section, and reinforcing means for said section.

6. The structure of claim 4, wherein the lower portion of each upright standard is provided with an offset section, and means for bracing said section including gusset plates and offset brace portions, each of whose upper ends is provided with an angular extension, said gusset plates and brace portions lying against and being attached to said offset section.

References Cited in the file of this patent

UNITED STATES PATENTS

| Number | Name | Date |
| --- | --- | --- |
| 26,547 | Dikeman | Dec. 20, 1859 |
| 160,792 | Saunders | Mar. 16, 1875 |
| 1,179,739 | Morrison | Apr. 18, 1916 |
| 1,491,857 | Heintz | Apr. 29, 1924 |
| 2,463,646 | Schassberger | Mar. 8, 1949 |